(12) United States Patent
Tan et al.

(10) Patent No.: US 11,378,640 B2
(45) Date of Patent: *Jul. 5, 2022

(54) APPARATUS OF RAPID-POSITIONING WITH CURVED LIGHT SURFACE

(71) Applicant: Lingtrack Technology (Shenzhen) Co. Ltd., Shenzhen (CN)

(72) Inventors: Guang Tan, Shenzhen (CN); Zhaoguang Wang, Shenzhen (CN); Yong Liu, Shenzhen (CN)

(73) Assignee: Lingtrack Technology (Shenzhen) Co., Ltd., Shenzhen (CN)

( * ) Notice: Subject to any disclaimer, the term of this patent is extended or adjusted under 35 U.S.C. 154(b) by 524 days.

This patent is subject to a terminal disclaimer.

(21) Appl. No.: 16/463,512

(22) PCT Filed: Nov. 5, 2018

(86) PCT No.: PCT/CN2018/113910
§ 371 (c)(1),
(2) Date: May 23, 2019

(87) PCT Pub. No.: WO2019/157840
PCT Pub. Date: Aug. 22, 2019

(65) Prior Publication Data
US 2021/0109182 A1  Apr. 15, 2021

(30) Foreign Application Priority Data
Feb. 13, 2018 (CN) .......................... 201810148395.8

(51) Int. Cl.
*G01S 1/70* (2006.01)
*G01S 5/16* (2006.01)
(52) U.S. Cl.
CPC .............. *G01S 1/7032* (2019.08); *G01S 5/16* (2013.01); *G01S 2201/02* (2019.08)

(58) Field of Classification Search
CPC ...... G01C 15/002; G01C 21/206; G01D 5/26; G01D 5/3473; G01S 1/7032; G01S 5/16;
(Continued)

(56) References Cited

U.S. PATENT DOCUMENTS 2,281,790 A * 5/1942 Newhall ................. G09F 13/00
40/432
3,227,882 A * 1/1966 Bissett ................... G01N 21/35
398/151

(Continued)

FOREIGN PATENT DOCUMENTS

CN  101939772 A  1/2011
CN  102981142 A  3/2013
(Continued)

OTHER PUBLICATIONS

Chinese Office Action for application No. 201810148395.8; dated Jun. 3, 2020.
(Continued)

*Primary Examiner* — Stephen R Burgdorf
(74) *Attorney, Agent, or Firm* — von Briesen & Roper, s.c.

(57) ABSTRACT

An apparatus of rapid-positioning with curved light surface includes a transmitter and a receiver. The transmitter can emit an optical signal to the receiver. The receiver can receive an optical signal emitted by the transmitter. The apparatus of rapid-positioning with curved light surface determines a position of the receiver according to the optical signal received by the receiver. The transmitter includes: a light emitter capable of emitting optical signals of at least two flicker frequencies; and a hollow hemispherical cover provided with fixed-angle opaque sections and variable-angle opaque sections, and regions between the fixed-angle opaque sections and the variable-angle opaque sections being light transmission regions. Therefore, the apparatus (Continued)

and method of rapid-positioning with curved light surface provided by the present application can accurately position the receiver, and the receiver can be placed on an object surface to receive the optical signal of the transmitter, so as to perform an accurate indoor positioning. Therefore, in an intelligent production environment, a robot can accurately assist to assemble and convey materials and products. The apparatus of rapid-positioning with curved light surface of the present application can perform multiple positioning during one rotation, which can make the positioning faster.

10 Claims, 5 Drawing Sheets

(58) Field of Classification Search
CPC ...... G01S 17/42; G01S 2201/02; G06F 3/042; G06F 3/0421; H04B 10/11; H04B 10/116; H04N 5/2353
USPC .......................................................... 340/953
See application file for complete search history.

(56) References Cited

U.S. PATENT DOCUMENTS

| | | | | |
|---|---|---|---|---|
| 3,400,275 | A * | 9/1968 | Trump | H03M 1/30 250/231.16 |
| 11,085,993 | B2 * | 8/2021 | Tan | H04B 10/1149 |
| 2005/0033474 | A1 * | 2/2005 | Kim | G05D 1/0234 700/245 |
| 2011/0090124 | A1 | 4/2011 | Liu et al. | |
| 2017/0078852 | A1 * | 3/2017 | Tan | H04B 10/1141 |
| 2017/0336596 | A1 * | 11/2017 | Nishimoto | G02B 7/1824 |
| 2019/0041490 | A1 * | 2/2019 | Dong | G01S 1/70 |
| 2019/0044616 | A1 * | 2/2019 | Laski | G08G 1/163 |

FOREIGN PATENT DOCUMENTS

| | | |
|---|---|---|
| CN | 103777176 A | 5/2014 |
| CN | 104735780 A | 6/2015 |
| CN | 104914407 A | 9/2015 |
| CN | 105157696 A | 12/2015 |
| CN | 105717488 A | 6/2016 |
| CN | 105824008 A | 8/2016 |
| CN | 105824010 A | 8/2016 |
| CN | 105866736 A | 8/2016 |
| CN | 106324564 A | 1/2017 |
| CN | 30416895 S | 6/2017 |
| CN | 304191765 S | 6/2017 |
| CN | 304241325 S | 8/2017 |
| CN | 107356904 A | 11/2017 |
| CN | 107430180 A | 12/2017 |
| CN | 107561495 A | 1/2018 |
| JP | H01127986 A | 5/1989 |
| TW | 201512692 A | 4/2015 |
| WO | 2012087944 A2 | 6/2012 |
| WO | WO 2012087944 A2 | 6/2012 |
| WO | 2015003108 A1 | 1/2015 |
| WO | 2017171964 A1 | 10/2017 |

OTHER PUBLICATIONS

Chinese Office Action for related Chinese Application No. 201810148395.8; dated Feb. 20, 2021.
Xiao Zhang, et al., "Research on Location and Speed Detection System for Rail Vehicles Based on Distributed Detection", 2007, pp. 22-23, College of Mechatronics Engineering and Automation, National University of Defense Technology, Changsha, China.
http://www.cnki.net, 1994-2014, China Academic Journal Electronics Publishing House.
International Search Report tor Application No. PCT/CN2018/113910 dated Nov. 5, 2018.

* cited by examiner

APPARATUS OF RAPID-POSITIONING WITH CURVED LIGHT SURFACE

CROSS-REFERENCE TO RELATED APPLICATION

This patent application is a 35 USC § 371 U.S. national stage of International Application No. PCT/CN2018/113910 filed on Nov. 5, 2018, which claims priority under the Paris Convention to the Chinese Patent Application No. 201810148395.8 filed on Feb. 13, 2018.

TECHNICAL FIELD

The present disclosure relates to spatial positioning technology, and more particularly relates to an apparatus of rapid-positioning with curved light surface.

BACKGROUND

In emerging applications such as robotics and large space virtual reality, position tracking is an important supporting technique. In an intelligent production environment, when a robot assists to assemble and convey materials and products, it requires precise location instructions to ensure correct delivery. Entertainment robots organized intro sets may need to collaborate with each other based on precise locations in order to accomplish certain tasks. Currently, main optical positioning technologies have either a low accuracy, or a small coverage area, or a high cost, and can only achieve accuracy to meters or decimeters. Due to building blockage, satellite signals cannot provide indoor positioning service, the achievable accuracy does not meet requirements, and the positioning is slow.

SUMMARY

Accordingly, it is necessary to provide an apparatus of rapid-positioning with curved light surface for the problem of low accuracy, small coverage, slow positioning, and high cost of the optical positioning technology.

An apparatus of rapid-positioning with curved light surface includes a transmitter and a receiver. The transmitter is capable of emitting an optical signal to the receiver. The receiver is capable of receiving the optical signal emitted by the transmitter. The apparatus of rapid-positioning with curved light surface determines a position of the receiver according to the optical signal received by the receiver. The transmitter includes: a light emitter capable of emitting optical signals with at least two flicker frequencies; and a hollow hemispherical cover provided with a plurality sets of opaque regions, each set of the opaque regions including a fixed-angle opaque section and a variable-angle opaque section, a region between the fixed-angle opaque section and a starting position of the opaque region being a light transmission region, and a region between the fixed-angle opaque section and the variable-angle opaque section being a light transmission region, and center angles corresponding to each arc of the fixed-angle opaque section on any latitude line of the cover being the same, and center angles corresponding to each arc of the variable-angle opaque section and the latitude line of the cover monotonically increases or decreases as the latitude of the cover increases.

In an embodiment, the number of species of the flicker frequency is the same as the number of the opaque regions.

In an embodiment, the plurality sets of opaque regions are disposed on the cover at equal intervals.

In an embodiment, an orthographic projection of the fixed-angle opaque section on a bottom circle of the cover is a sector, and center angles corresponding to the fixed-angle opaque sections of different opaque regions are different.

In an embodiment, an orthographic projection of the variable-angle opaque section on the bottom circle of the cover is enclosed by two arcuate edges and a straight edge, and one of the arcuate edges is centered on a center of the bottom circle of the cover, and the other of the arcuate edges and the straight edge intersect at the center of the bottom circle.

In an embodiment, the other of the arcuate edges is convex or concave toward the first arcuate edges.

In an embodiment, the transmitter is at least provided with a controller, a driving device, a base and a rotary base; the controller is connected to the driving device and is used to control an operation of the driving device; the driving device is connected to the rotary base and is used to drive the rotary base to uniformly rotate at preset angular velocity, the rotary base is fixedly connected to the cover, and when the rotary base rotates, the cover can be driven to rotate synchronously.

In an embodiment, the transmitter is further provided with a rotation detecting unit used to detect a rotation angle of the rotary base, and the controller controls the light emitter to have different flicker frequencies in a time period during which adjacent opaque regions are swept according to a detecting result of the rotation detecting unit.

In an embodiment, the rotation detecting unit includes an optical coupler and a light blocking plate, the optical coupler is provided with a notch; and the light blocking plate is located on the rotary base and a position thereof corresponds to the optical coupler, and the light blocking plate is capable of passing through the notch of the optical coupler when the rotary base rotates.

In an embodiment, the receiver is at least provided with a receiving single chip microcomputer, an optical sensor, and a wireless module; the optical sensor is used to receive the optical signal emitted by the transmitter; the receiving single chip microcomputer is connected to the optical sensor and used to process information of the optical signal received by the optical sensor; the wireless module is connected to the receiving single chip microcomputer, used to receive an information processed result of the receiving single chip microcomputer, and sends the information processed result to a server.

Therefore, the apparatus and method of rapid-positioning with curved light surface provided by the present application can accurately position the receiver, and the receiver can be placed on an object surface to receive the optical signal of the transmitter, so that an accurate indoor positioning can be carried out. Therefore, in an intelligent production environment, a robot can accurately assist to assemble and convey materials and products. The apparatus of rapid-positioning with curved light surface of the present application can perform multiple positioning during one rotation, which can make the positioning faster.

DETAILED DESCRIPTION OF THE EMBODIMENTS

In order to facilitate understanding of the present disclosure, a more comprehensive description of an apparatus of rapid-positioning with curved light surface will be provided below with reference to the accompanying drawings. A preferred embodiment of the apparatus of rapid-positioning with curved light surface is given in the drawings. However, the apparatus of rapid-positioning with curved light surface can be implemented in many different forms and is not limited to the embodiments described in this disclosure. Rather, these embodiments are provided so that this disclosure of the apparatus and the method of positioning with curved light surface will be thorough and complete.

Unless otherwise defined, all terms (including technical and scientific terms) used herein have the same meaning as commonly understood by one of ordinary skill in the art to which this disclosure belongs. The terms used in the specification of the apparatus of rapid-positioning with curved light surface are only for the purpose of describing specific embodiments, and not to limit the present application.

Figure 1:
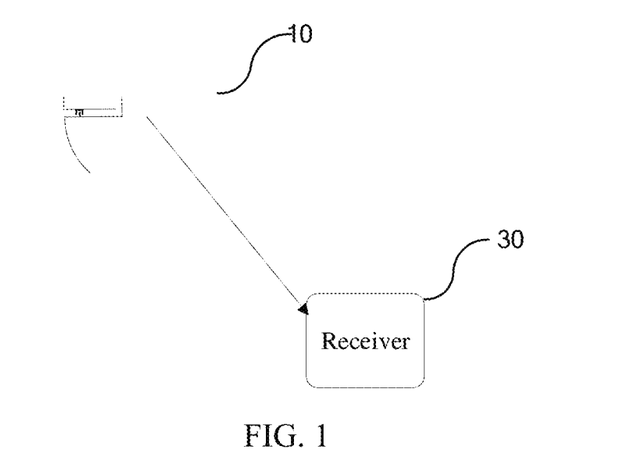
FIG. 1 is a schematic diagram of an apparatus of rapid-positioning with curved light surface in accordance with an embodiment of the present disclosure.

FIG. 1 illustrates a schematic diagram of an apparatus of rapid-positioning with curved light surface according to an embodiment. The apparatus of rapid-positioning with curved light surface includes a transmitter 10 and a receiver 30. The transmitter 10 is used to transmit an signal. The receiver 30 is used to receive the signal transmitted by the transmitter 10 and is capable of determining a position of itself according to the received signals.

Figure 2:
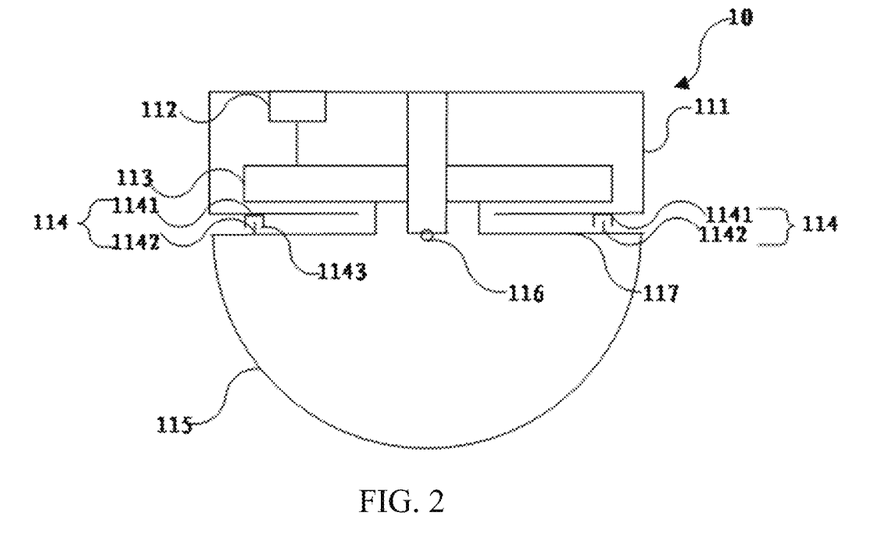
FIG. 2 is a schematic diagram of a transmitter of the apparatus of rapid-positioning with curved light surface of FIG. 1.

Referring to FIG. 2, in this embodiment, the transmitter 10 includes a base 111, a controller 112, a driving device 113, a rotation detecting unit 114, a cover 115, a light emitter 116, and a rotary base 117.

The light emitter 116 is used to emit optical signals with preset flicker frequencies. The light emitter 116 can emit optical signal with at least two flicker frequencies. Specifically, the light emitter 116 can be a light emitting diode (LED), a compact fluorescent lamp (CFL), or other light emitters which emit optical signals that can be received by an optical sensor.

In an embodiment, the light emitter 116 is an LED, which is located at a center of a bottom circle of the cover 115.

Furthermore, the light emitter 116 is disposed on the base 111. Specifically, the base 111 has a cylindrical mounting portion. A surface of the mounting portion facing the cover 116 is coplanar with the bottom circle of the cover 115. The light emitter 116 is located on the surface of the mounting portion facing the cover 115 and coincides with the center of the bottom circle of the cover 115.

The driving device 113 is connected to the controller 112 and located inside the base 111. The driving device 113 is connected to the rotary base 117 and is capable of driving the rotary base 117 to uniformly rotate at a preset angular velocity.

The controller 112 controls the driving device 113 to operate in a preset manner.

Optionally, a position for fixing the driving device 113 is not limited thereto, as long as it can drive the rotary base 117 to rotate.

In this embodiment, the driving device 113 surrounds the cylindrical mounting portion and is used to drive the rotary base to rotate.

The rotation detecting unit 114 is used to detect a rotational position of the rotary base 117. In this embodiment, the rotation detecting unit 114 generates a corresponding detection signal when the rotary base 117 rotates one complete rotation period, and transmits the detection signal to the controller 112. The controller 112 controls the light emitter 116 to switch between transmitting optical signals of a first flicker frequency and a second flicker frequency according to the detection signal. Specifically, the controller 112 controls the optical signals in successive rotation periods to be with alternating flicker frequencies.

Specifically, the rotation detecting unit 114 includes an optical coupler 1141 and a light blocking plate 1142. The optical coupler 1141 is disposed on the base 111. The light blocking plate 1142 is disposed on the rotary base 117 and is capable of rotating with the rotary base 117. The optical coupler 1141 is provided with a notch 1143 facing the rotary base 117. A position of the light blocking plate 1142 corresponds to the notch 1143 on the optical coupler 1141. In other words, during rotation of the light blocking plate 1142 driven by the rotary base 117, the light blocking plate 1142 is capable of passing through the notch 1143 without contacting the optical coupler 1141. The optical signal of the optical coupler 1141 passes through the recess 1143, and when the light blocking plate 1142 is located at the notch 1143 of the optical coupler 1141, the optical signal thereof is blocked, therefore the optical coupler 1141 can detect no optical signal. At this time, the controller 112 controls the light emitter 116 to perform frequency switching.

In this embodiment, the rotation detecting unit 114 is disposed on the rotary base 117 corresponding to adjacent edges of each opaque region 20.

The rotary base 117 is fixedly connected to the cover 115, so that the cover 115 can be driven to rotate synchronously when the rotary base 117 rotates. Specifically, the rotary base 117 can be optionally shaped as a circular disc, a circular ring, or other annular structures. In an embodiment, the rotary base 117 is shaped as a circular ring.

Figure 3:
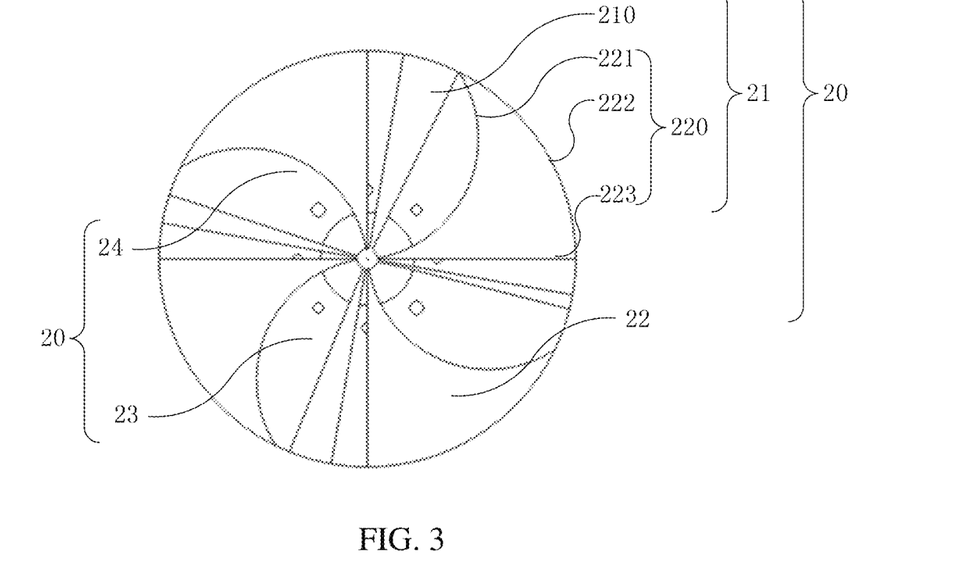
FIG. 3 is a bottom view of a cover of the transmitter of FIG. 2.

Further referring to FIG. 3, the cover 115 is of a hollow hemispherical shape and defines a hemispherical space therein. Specifically, the cover 115 can be a hollow semi-ellipsoidal cover, a hollow semi-spherical cover, a hollow partial ellipsoid or a sphere combined with a bottom planar disk cover, or other hollow hemispherical structures. In the illustrated embodiment, the cover 115 is a semi-spherical cover.

A spherical surface of the cover 115 is provided with an opaque region 20. The opaque region 20 includes a fixed-angle opaque section 210 and a variable-angle opaque section 220. The fixed-angle opaque section 210 and the variable-angle opaque section 220 are opaque portions of the spherical surface of the cover 115. Other regions of the spherical surface of the cover 115 are light transmission portions, where the optical signals of the light emitter 116 can pass through.

In this embodiment, the spherical surface is divided into four equal parts, and includes a first opaque region 21, a second opaque region 22, a third opaque region 23, and a fourth opaque region 24. The light emitter 116 emits optical signals with different flicker frequencies in each opaque region 20.

The first opaque region 21 includes a first fixed-angle opaque section 210 and a first variable-angle opaque section 220.

The second opaque region 22 includes a second fixed-angle opaque section and a second variable-angle opaque section.

The third opaque region 23 includes a third fixed-angle opaque section and a third variable-angle opaque section.

The fourth opaque region 24 includes a fourth fixed-angle opaque section and a fourth variable-angle opaque section.

It can be understood that the number of the opaque regions 20 of the present disclosure is not limited to four, and can be other numbers, such as two, three, five, six, seven, eight, and the like.

The number of species of the flicker frequencies of the light emitter 116 corresponds to the number of opaque regions 20 in the cover 115. In this embodiment, the flicker frequency of the light emitter 116 corresponding to the first opaque region 21 is 10K, the flicker frequency of the light emitter 116 corresponding to the second opaque region 22 is 15K, the flicker frequency of the light emitter 116 corresponding to the third opaque region 23 is 20K, and the flicker frequency of the light emitter 116 corresponding to the fourth opaque region 24 is 25 KHz. The receiver 30 determines a horizontal angle rotated by the cover 115 according to different flicker frequencies of the light emitter 116.

An orthographic projection of the variable-angle opaque section on the bottom circle of the cover 115 is enclosed by two arcuate edges and a straight edge. A first arcuate edge 222 is one of the arcuate edges centered on a center of the bottom circle of the cover 15, and the other arcuate edge and the straight edge intersect at the center of the bottom circle and intersect with two ends of the first arcuate edge 222, respectively. The other arcuate edge protrudes toward the first arcuate edge 222.

The cover 115 includes the opaque regions 20, and center angles of the fixed-angle opaque section of different opaque regions 20 are different. The first fixed-angle opaque section 210 of the first opaque region 21 is taken as an example to describe a specific shape thereof. An orthographic projection of the first fixed-angle opaque section 210 on the bottom circle 115 of the cover is a sector, whose arc center coincides with the center of the bottom circle of the cover 115. A center angle corresponding to an arc of the sector is 4 degrees. It can be understood that the center angle corresponding to the arc of the sector 30 can be other degrees, such as 8 degrees, 12 degrees, 16 degrees, etc. Center angles corresponding to each arc of the first fixed-angle opaque portion 211 on any latitude line of the cover 112 are the same, thus it is called the fixed-angle opaque section. Center angles of respective fixed-angle opaque sections are different, and the remaining shapes thereof are the same, which is not described in detail herein again.

The variable-angle opaque section is disposed between adjacent fixed-angle opaque sections, and the fixed-angle opaque section is in one-to-one correspondence with the variable-angle opaque section.

When the cover 115 is rotated at a constant angular velocity, a time period during which a shadow of each fixed-angle opaque section passes through the receiver 30 once is also constant, so that an exact fixed-angle opaque section passed through the receiver 30 can be determined according to the time period during which the shadow of the fixed-angle opaque section has passed through the receiver 30 once.

In this embodiment, an angle between orthographic projections of adjacent opaque regions on the bottom circle is 10 degrees, and it can be understood that the angle between orthographic projections of adjacent opaque regions on the bottom circle can also be other values, such as 15 degrees, 20 degrees, 25 degrees, 30 degrees, 35 degrees, etc.

An orthographic projection of the variable-angle opaque section on the bottom circle of the cover 115 consists of two arcuate edges and a straight edge. The first variable-angle opaque section 220 of the first opaque region 21 is taken as an example 21 to describe a specific shape thereof. The first variable-angle opaque section 220 includes a first arcuate edge 222, a second arcuate edge 221, and a first straight edge 223. The first arcuate edge 222 is centered on the center of the bottom circle, and the second arcuate edge 221 and the first straight edge 223 intersect at the center of the bottom circle and intersect with two ends of the first arcuate edge 222, respectively. In this embodiment, the second arcuate edge 221 is a partial arc, and the first straight edge 223 is a straight line. The second arcuate edge 221 is a circular arc of a circle, and circumference of the circle passes through the center of the bottom circle. If the diameter of the circle is less than or equal to the radius of the bottom circle, then a point on the circumference of the circle that is farthest from the center of the bottom circle is an inscribed point, and a circular arc between the inscribed point and the center of the bottom circle is exactly the second arcuate edge 221. If the diameter of the circle is greater than the radius of the bottom circle, there are two intersection points between the circumference of the circle and the bottom circle, and an intersection point closer to the first straight edge 223 is an intercept point. A circular arc between the intercept point and the center of the bottom circle is exactly the second arcuate edge 221. In this embodiment, the second arcuate edge 221 protrudes toward the first arcuate edge 222. Center angles corresponding to each arc of the variable-angle opaque section 220 on any latitude line of the cover 115 are different, that's why it is called variable-angle opaque section 220. Specifically, center angles corresponding to each arc of the variable-angle opaque section 220 on the latitude line of the cover 115 monotonically decreases as the latitude of the cover 115 increases. Each variable-angle opaque section has the same shape, which will not be described in detail herein again.

In the illustrated embodiment, the orthographic projection of the first opaque region 21 on the bottom circle is located in an interval of [0°, 90°], an orthographic projection of the second opaque region on the bottom circle is located in an interval of [90°, 180°], an orthographic projection of the third opaque region 23 on the bottom circle is located in an interval of [180°, 270°], and an orthographic projection of the fourth opaque region on the bottom circle is located in an interval of [270°, 360°]. A center angle corresponding to the orthographic projection of the fixed-angle opaque section of the first opaque region 21 on the bottom circle is 16°, a center angle corresponding to the orthographic projection of the fixed-angle opaque section of the second opaque region on the bottom circle is 4°, and a center angle corresponding to the orthographic projection of the fixed-angle opaque section of the third opaque region on the bottom circle is 12°, and a center angle corresponding to the orthographic projection of the fixed-angle opaque section of the fourth opaque region on the bottom circle is 8°.

It should be understood that the shape of the variable-angle opaque section is not limited to the illustrated embodiment. For example, radian of each arc the variable-angle opaque section on the latitude line of the cover 115 monotonically increases as the latitude of the cover 115 increases, at this time, the second arcuate edge 221 protrudes away from the first arcuate edge 222.

In addition, it could be understood that the second arcuate edge 221 and the first straight edge 223 can be replaced with edges of other arbitrary suitable shape, as long as center angles corresponding to each arc of the variable-angle opaque section on the latitude line of the cover 115 monotonically increases or decreases as the latitude of the cover 115 increases.

The latitude of the cover 115 represents reference positions on the spherical surface of the cover 115. The latitude of the cover 115 decreases gradually from the polar of the cover 115 to the bottom circle of the cover 115, where the polar of the cover corresponds to a point on the surface of the cover 115 which has a maximum vertical distance from a top of the cover 115 to the bottom circle of the cover 115.

Figure 4:
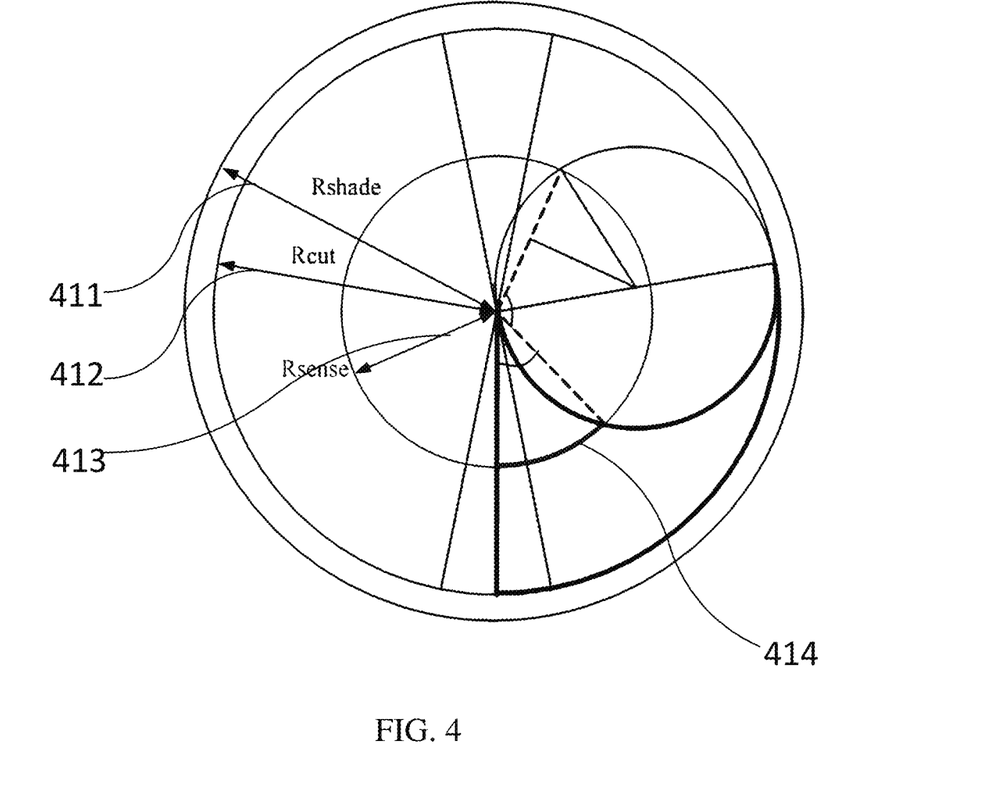
FIG. 4 is a schematic diagram of a receiver of FIG. 1.

FIG. 4 illustrates a schematic diagram of the receiver 30 according to an embodiment. In the illustrated embodiment, the receiver 30 includes a receiving single chip microcomputer 301, a wireless module 302, and an optical sensor 303. The optical sensor 303 is capable of receiving the optical signals transmitted from the light emitter 116 of the transmitter 10. The optical signals are analog-to-digital converted and transmitted to the receiving single chip microcomputer 301. The receiving single chip microcomputer 301 calculates a vertical angle, a horizontal angle, and a final position of the optical sensor 303 with respect to the light emitter 116 according to the optical signal data and preset information, and transmits a calculation result to the wireless module 302. The wireless module 302 is capable of wirelessly transmitting data to a server. Specific but not limited, the wireless module 302 can transmit the calculation result of the receiving single chip microcomputer 301 to a remote monitor or a server.

Specifically, the wireless module 302 can be Bluetooth, GPRS, EDGE, Wi-Fi, 2G, 3G, 4G, 5G communication devices or other wireless transmission devices.

A method of positioning with curved light surface is specifically described in accordance with above embodiments and FIG. 5, FIG. 6, FIG. 7, and FIG. 8.

Figure 5:
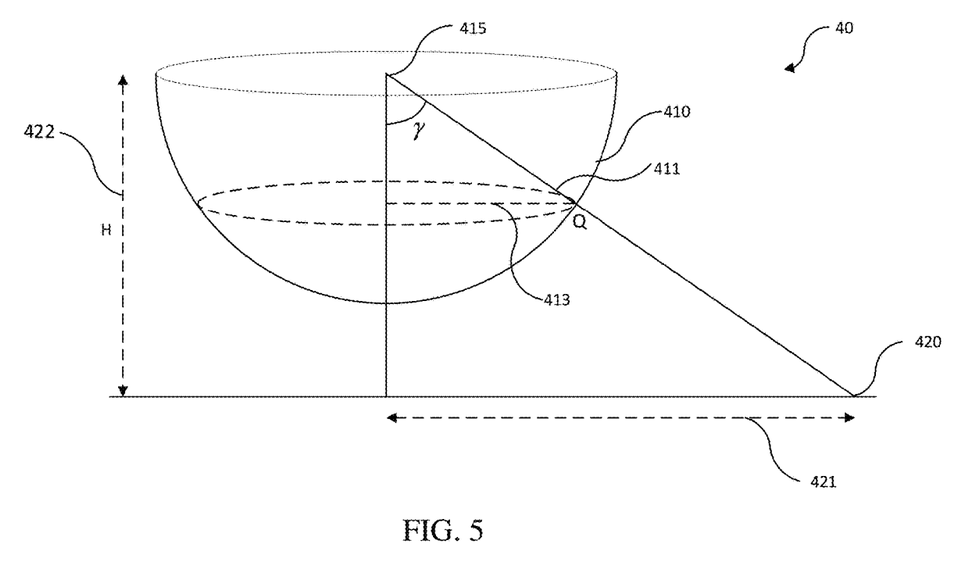
FIG. 5 is a first schematic diagram of a light surface positioning algorithm.
Figure 6:
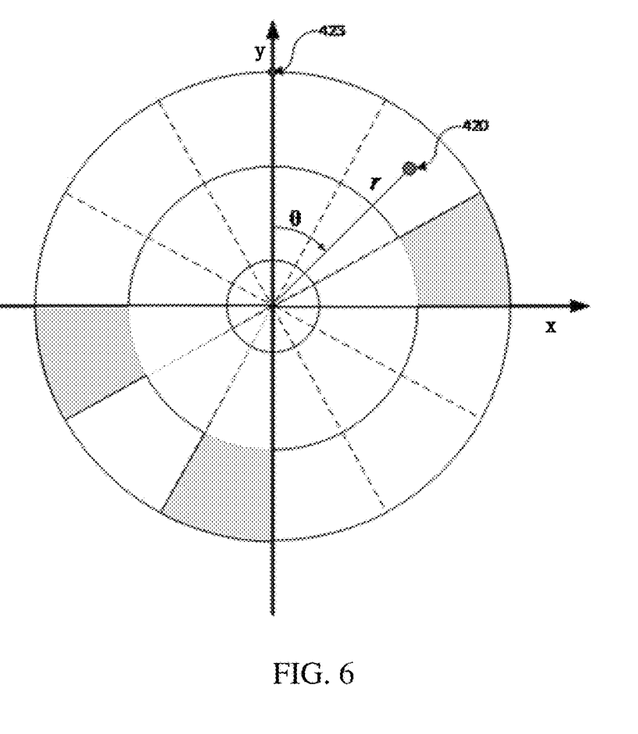
FIG. 6 is a second schematic diagram of the light surface positioning algorithm.

In this embodiment, the preset information of the receiver 30 includes a radius 411 of the bottom circle of the cover 115, a diameter 412 of a circle that contains a shorter arcuate edge of the variable-angle opaque section, rotating speed of the rotary base, and a center angle corresponding to the arc the fixed-angle opaque region on any latitude line of the cover, height of the transmitter, a vertical height difference 422 between the transmitter and the receiver 30.

Since the angle of the fixed-angle opaque region 210 is constant and known in advance, a reference width can be calculated by collecting optical signals from the optical sensor 303, and obtaining a sampling frequency Rate and a rotating speed Rev of the rotary base. The reference width is a shadow width corresponding to the fixed-angle opaque region 210.

Referring to FIG. 5 and FIG. 6, a point Q in FIG. 6 is an intersection point of a connecting line between the light emitter 116 and the optical sensor 303 in the receiver 30 and the cover 115, and it is defined that:

Rshade is the radius 411 of the bottom circle of the cover 115;

Rcut is a diameter 412 of a circle that contains the second arcuate edge of the variable-angle opaque section, in this embodiment, Rcut=cos(Pi/16)*Rshade;

Rsense is a radius 413 of a circle corresponding to a line of latitude that passes the point Q;

ShadowLen is the shadow width 414 of the variable-angle opaque section, which can be acquired by counting the number of samples received by the receiver 30 during the time period in which the shadow passes through the receiver 30;

PeriodLen is the frame length, that is, the number of samples received by the receiver during a rotation period of the cover, which is obtained from a formula:

PeriodLen=Rate*60/Rev;

r is a horizontal distance 421 between the light emitter and the receiver;

H is the vertical height difference 422 between the transmitter and the receiver.

Referring to FIGS. 5 and 6, the following formulas can be obtained:

(Rsense/2)/Rcut=cos(β/2)

2Rcut=Rshade

Therefore,

Rsense/Rshade=cos(β/2)

Referring to FIG. 5, the following formulas can be obtained:

7π/12−β/2=α=ShadowLen/PeriodLen·2π

β=(7/6−2ShadowLen/PeriodLen)π

FIG. 5 further illustrates that:

Rsense=Rshade·Sin γ

Therefore, r=H·tan(arcsin(Rsense/Rshade))=H·tan(arcsin(cos β/2)))=H·tan(arcarcsin (cos(7/12−2ShadowLen/PeriodLen)π))

Wherein,

γ=arcsin(cos(7/12−ShadowLen/PeriodLen)π)

The vertical angle γ can be obtained by substituting the shadow width ShadowLen and the frame length PeriodLen of the variable-angle opaque section measured by the receiver into above formulas.

Figure 7:
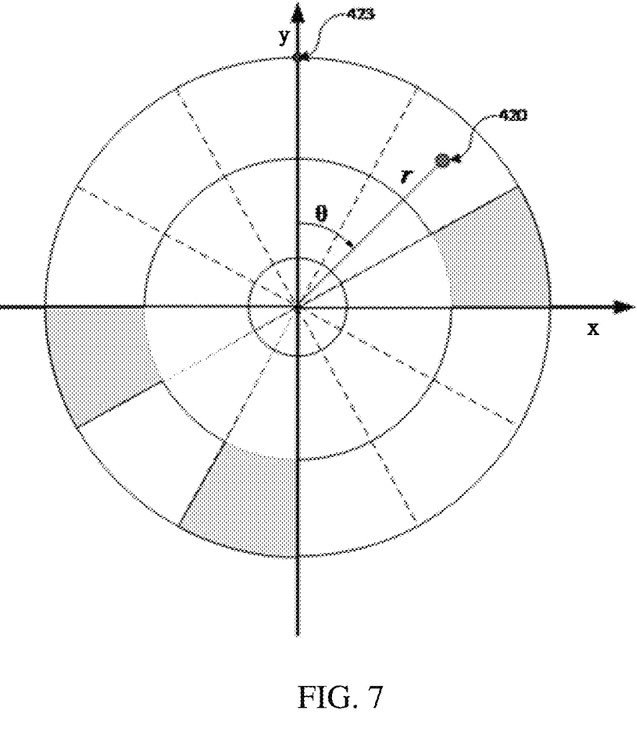
FIG. 7 is a schematic diagram of a polar coordinate area formed by the transmitter of FIG. 1 projecting on the ground.

Referring to FIG. 7, it is a schematic diagram of a polar coordinate area formed by the transmitter of FIG. 1 projecting on the ground.

The horizontal angle θ is an included angle formed by a straight line 423 from the polar coordinate center to the rotational starting point and a straight line 420 from the polar coordinate center to the receiver 30. A manner of obtaining the horizontal angle of the present embodiment will be described in detail below with reference to the accompanying drawings.

Figure 8:
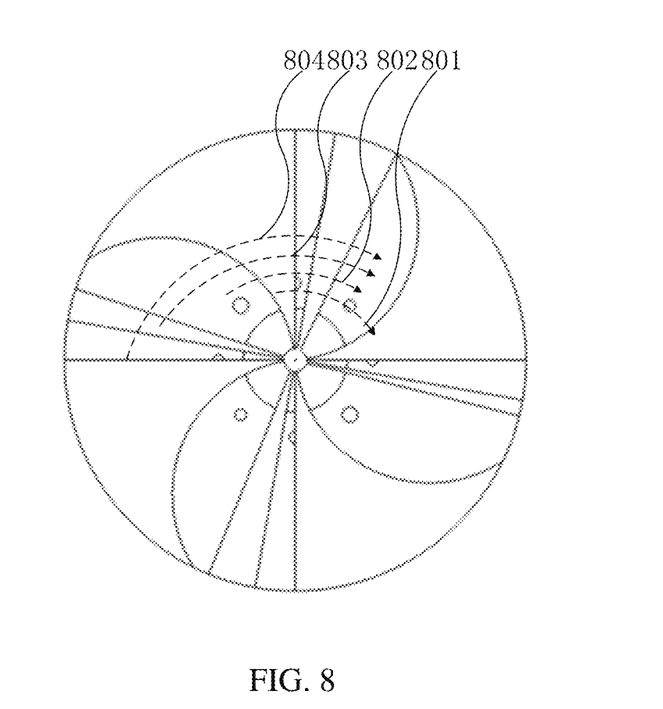
FIG. 8 is a third schematic diagram of the light surface positioning algorithm.

Referring to FIG. 8, the receiver 30 detects the flicker frequency, and collects the optical signal emitted by the transmitter, and the optical signal emitted by the transmitter by rotating 3/2 opaque region is defined as one frame.

When the shadow of the fixed-angle opaque section and the variable-angle opaque section passes through the receiver, the optical signal collected by the receiver is in a low-level state. When the optical signal emitted by the transmitter is not blocked, the optical signal collected by the receiver is in a high-level state. The receiver 30 determines a level interval of corresponding optical signal by collecting the optical signal.

A time interval of a duration interval of the low-level state of the receiver 30 is indicated by "−".

A time interval of a duration interval of the high-level state of the receiver 30 is indicated by "+".

A time interval of a duration interval of the high-level state generated by the interval angle is indicated by "gap".

A time interval of a duration interval of the low-level state generated by the fixed-angle opaque section is indicated "−gap_var".

A time interval of a duration interval of the low-level state generated by the variable-angle opaque section is indicated by "?".

A sequence of duration intervals of undetermined level state is indicated by " . . . ".

In an embodiment, for each opaque region, state sequences of the receiver 30 in one frame can include the following ones.

A first state sequence 801 is (−, gap, −gap_var, +, . . . ).

A second state sequence 802 is (+, ?, gap, −gap_var, +, . . . ).

A third state sequence 803 is (−, +, ?, gap, −gap_var, +, . . . ).

A fourth state sequence 804 is (+, −gap_var, +, ?, gap, −gap_var, +, . . . ).

Since the width of the fixed-angle opaque section of each opaque region is different, a combination (gap, −gap_var) formed by the duration interval gap of the high-level state generated by the interval angle and the duration interval −gap_var of the low-level state generated by the fixed-angle opaque section can determine one opaque region. By detecting the sequence states of a frame of signals, the opaque region experienced by the current frame can be determined. Statistic variables in the optical signal collected from the receiver 30 include:

1) two frequencies of the optical signals emitted by the light emitter 116 experienced by the current frame;

2) offset angle in the cover, that is, a starting angle of the opaque region corresponding to the duration interval gap of the low-level state generated by the fixed-angle opaque section in the positioned combination segment (gap, −gap_var);

3) intra-frame offset length, that is, the sum of the number of data points of all the sections in front of the combination segment (gap, −gap_var) of the current frame;

4) the number of data points generated by the variable-angle opaque section, that is, the shadow width of the variable-angle opaque section.

The horizontal angle θ can be calculated from three variables:

1) an initial angle $\theta_1$ of the cover at the beginning of the frame, which is an angle of the opaque region corresponding to an initial flicker frequency in one frame, and can be determined according to the flicker frequency, when the flicker frequency corresponds to the first opaque region, $\theta_1$ is 0°;

2) offset angle in the cover $\theta_2$;

3) intra-frame offset angle $\theta_3$, (intra-frame offset length/frame length)*360°=$\theta_3$.

The horizontal angle θ=$\theta_2$−$\theta_1$−$\theta_3$.

In the illustrated embodiment, the offset angle in the cover is an angle of an opaque region where the fixed-angle opaque section corresponding to −gap_var in one frame is located, and if the angle corresponding to −gap_var is 4°, due to that the angle of the fixed-angle opaque section of each opaque region is successively 16°, 4°, 12°, 8°, then the opaque region thereof can be determined as the second opaque region and the offset angle $\theta_1$ in the cover is 90°. The initial angle of the cover at the beginning of the frame can be determined according to the flicker frequencies collected in one frame, and the flicker frequency collected in the one frame is represented by ($f_1$, $f_2$), if $f_1$=25 KHz, and the 25 KHZ corresponds to the fourth opaque region, then the initial angle 92 of the cover at the beginning of the frame is 270°.

The horizontal angle θ and the vertical angle γ can be calculated according to the afore-described method to determine a two-dimensional coordinate of the receiver 30.

If a relative height of the vertical height difference 422 between the transmitter and the receiver is unknown, two transmitters 10 with different flicker frequencies can be used with a frequency division multiplexing method. The receiver 30 receives the optical signals emitted by the two transmitters 10 to determine a vertical height of the receiver 30 and calculate a three-dimensional position of the receiver 30.

When the apparatus and method of rapid-positioning with curved light surface are used, the optical signal is emitted to the receiver 30 through the transmitter 10, and the receiver 30 performs data processing and calculation according to the received optical signal to obtain the position of the receiver 30, and transmits the position of the receiver 30 to the server or remote monitoring terminal through the wireless module 302.

Thus, the apparatus and method of rapid-positioning with curved light surface provided in present disclosure can accurately position the receiver, and the receiver can be placed on an object surface to receive the optical signal of the transmitter, so that a precise indoor positioning can be carried out. Therefore, in an intelligent production environment, a robot can accurately assist to assemble and convey materials and products. The apparatus of rapid-positioning with curved light surface of the present application can perform multiple positioning during one rotation, which can make the positioning faster.

The technical features of the above embodiments can be arbitrarily combined. For the sake of brevity of description, all possible combinations of the technical features in the above embodiments are not described. However, as long as there is no collision in the combination of these technical features, it should be considered as the scope described in this specification.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. An apparatus of rapid-positioning with curved light surface, comprising:
   a transmitter; and
   a receiver;
   wherein the transmitter is capable of emitting an optical signal to the receiver, the receiver is capable of receiving the optical signal emitted by the transmitter, the apparatus of rapid-positioning with curved light surface determines a position of the receiver according to the optical signal received by the receiver;
   wherein the transmitter comprises:
   a light emitter capable of emitting optical signals with at least two flicker frequencies; and a hollow hemispherical cover provided with a plurality of sets of opaque regions, each set of the opaque regions comprising:
a fixed-angle opaque section and a variable-angle opaque section;
a light transmission region between a starting position of each opaque region and the fixed-angle opaque section;
a second light transmission region between the fixed-angle opaque section and the variable-angle opaque section;
a fixed center angle corresponding to each arc of the fixed-angle opaque section on any latitude line of the cover being the same; and
a variable center angle corresponding to each arc of the variable-angle opaque section on the latitude line of the cover monotonically increases or decreases as the latitude of the cover increases.

2. The apparatus of rapid-positioning with curved light surface according to claim 1, wherein the number of species of the flicker frequency is the same as the number of the plurality of sets of opaque regions.

3. The apparatus of rapid-positioning with curved light surface according to claim 1, wherein the plurality of sets of opaque regions are disposed on the cover at equal intervals.

4. The apparatus of rapid-positioning with curved light surface according to claim 1, wherein an orthographic projection of the fixed-angle opaque section on a bottom circle of the cover is a sector, and the fixed center angle corresponding to the fixed-angle opaque sections of different opaque region sets are different.

5. The apparatus of rapid-positioning with curved light surface according to claim 1, wherein an orthographic projection of the variable-angle opaque section on a bottom circle of the cover is enclosed by two arcuate edges and a straight edge, and one of the arcuate edges is centered on a center of the bottom circle of the cover, and the other of the arcuate edges and the straight edge intersect at the center of the bottom circle.

6. The apparatus of rapid-positioning with curved light surface according to claim 5, wherein the other of the arcuate edges is convex or concave toward the first arcuate edges.

7. The apparatus of rapid-positioning with curved light surface according to claim 1, wherein the transmitter is at least provided with a controller, a driving device, a base and a rotary base; the controller is connected to the driving device and is configured to control an operation of the driving device; the driving device is connected to the rotary base and is configured to drive the rotary base to uniformly rotate at preset angular velocity; the rotary base is fixedly connected to the cover, and when the rotary base rotates, the cover can be driven to rotate synchronously.

8. The apparatus of rapid-positioning with curved light surface according to claim 7, wherein the transmitter is further provided with a rotation detecting unit configured to detect a rotation angle of the rotary base, and the controller controls the light emitter to have different flicker frequencies in a time period during which adjacent opaque region sets are swept according to a detecting result of the rotation detecting unit.

9. The apparatus of rapid-positioning with curved light surface according to claim 8, wherein the rotation detecting unit comprises an optical coupler and a light blocking plate, the optical coupler is provided with a notch; and the light blocking plate is located on the rotary base and a position thereof corresponds to the optical coupler, and the light blocking plate is capable of passing through the notch of the optical coupler when the rotary base rotates.

10. The apparatus of rapid-positioning with curved light surface according to claim 1, wherein the receiver is at least provided with a receiving single chip microcomputer, an optical sensor, and a wireless module; the optical sensor is configured to receive the optical signal emitted by the transmitter; the receiving single chip microcomputer is connected to the optical sensor and configured to process information of the optical signal received by the optical sensor; the wireless module is connected to the receiving single chip microcomputer, configured to receive an information processed result of the receiving single chip microcomputer, and send the information processed result to a server.

* * * * *